United States Patent [19]

Arai et al.

[11] Patent Number: 4,959,447
[45] Date of Patent: Sep. 25, 1990

[54] COPOLY(IMIDINE-IMIDE)

[75] Inventors: Mitsuru Arai, San Marcos; Patrick E. Cassidy, Austin; James M. Farley, League City, all of Tex.

[73] Assignee: Nippon Steel Corporation, Tokyo, Japan

[21] Appl. No.: 240,491

[22] Filed: Sep. 2, 1988

Related U.S. Application Data

[63] Continuation-in-part of Ser. No. 114,288, Oct. 29, 1987, abandoned.

[51] Int. Cl.$^5$ .................. C08G 73/10; C08G 73/14
[52] U.S. Cl. ............................ 528/188; 525/432; 525/435; 525/928; 528/189; 528/350; 528/353; 528/354
[58] Field of Search ............... 528/353, 350, 354, 188, 528/189; 525/432, 435, 928

[56] References Cited

U.S. PATENT DOCUMENTS 4,378,400  3/1983  Makino et al. ................. 528/353

OTHER PUBLICATIONS

Mitsuru Veda et al., "Synthesis of Polybenzodipyrrolodiones by Thermo Cyclodehydration of Polyamide Derives from Dibenzylbenzodefurandiones and Aliphatc Diamines", Journal of Polymer Science, vol. 14, 591–602 (1976).

Sroog et al., "Aromatic Polypyromellitimides from Aromatic Polyamic Acids", Journal of Polymer Science: Part A vol. 3, pp. 1373–1390 (1965).

*Primary Examiner*—Veronica P. Hoke
*Attorney, Agent, or Firm*—Cushman, Darby & Cushman

[57] ABSTRACT

A copoly(imidine-imide) consisting of a copolymer of polyimidines and polyimides having, in the basic chain structure of the polymer, imidine structures represented by formula (I) and the imide structures represented by formula (II):

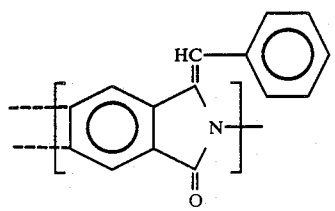

[I]

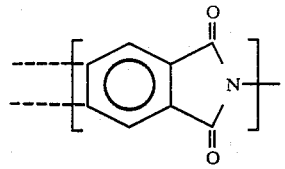

[II]

6 Claims, 2 Drawing Sheets

COPOLY(IMIDINE-IMIDE)

CROSS-REFERENCE TO RELATED APPLICATION

This application is a continuation-in-part of Ser. No. 114288, filed Oct. 29, 1987, now abandoned.

BACKGROUND OF THE INVENTION

1. Field of the Invention

The present invention relates to a copolymer of polyimides and polyimidines. More specifically, it relates to a novel copoly(imidine-imide) having both practical usability and heat resistance.

The copolymers of polyimides and polyimidines according to the present invention are utilized in various fields, specially as layer insulating materials for LSI, solder-resists, liquid crystal oriented films, various protective films, enamel varnishes, flexible print circuit substrates, etc., in the electric and electronic material fields; as plastic lenses, optical pick-up structures, etc., in the optical field; and as gas separation and purification apparatuses such as medical and industrial oxygen enrichment apparatuses, filter apparatuses such as food or medical water purifiers, gas-liquid separation apparatuses in the separation membrane field; and in the heat resistant adhesive field.

2. Description of the Related Art

In the prior art, polyimide resins have been used as heat resistant polymers, and for the production thereof, there has been reported, for example, the method of dehydrocyclization of polyamic acid under heat following a condensation reaction with aromatic tetracarboxylic dianhydride and a diamine in, for example, the Journal of Polymer Science, Part A, 3, 1373–1390 (1965)).

On the other hand, polyimidines are polymers developed for eliminating the defects of polyimides, and a process for the production thereof has been reported in the Journal of Polymer Science, Polymer Chemistry Edition, 14, 591–602 (1976); ibid, 14, 1485 (1976); ibid, 14, 1519 (1976); ibid, 14, 2391–2397 (1976).

The polyimide resins produced according to the afore-mentioned process have a superior heat resistance, but are insoluble or slightly soluble in general solvents, with the exception of some special solvents, which places numerous restrictions on their use.

Furthermore, polyimidine resins alleviate the defects of the afore-mentioned polyimide resins, and further, show a superior heat resistance, but it is difficult to obtain a high molecular weight and thus a practical polymer has not been obtained.

Recently, Imai et al reported high molecular weight polyimidine resins in the Journal of Polymer Science, Polymer Chemistry Edition, 21, 1241–1249 (1983), but this relates to a polyimidine using monomers synthesized through extremely complicated processed, and thus difficult to produce on a commercial scale.

SUMMARY OF THE INVENTION

Accordingly, the object of the present invention is to obviate the above-mentioned defects in the prior art and to provide a novel polymer having the advantages of polyimides and polyimidines and maintaining the characteristic heat resistance of polyimides and polyimidines.

Other objects and advantages of the present invention will be apparent from the following description.

In accordance with the present invention, there is provided a copoly(imidine-imide) comprising a copolymer of polyimidines and polyimides having, in the basic chain structure of the polymer, the imidine structures represented by formula (I) and the imide structures represented by formula (II):

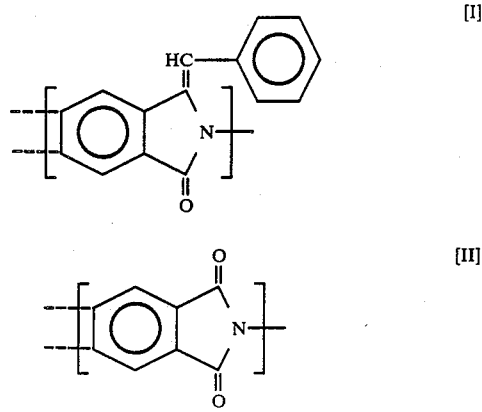

The dotted lines of the formulae (I) and (II) denote the following variations of the formulae (I-a), (I-b), and (I-c) and (II-a) and (II-b), respectively.

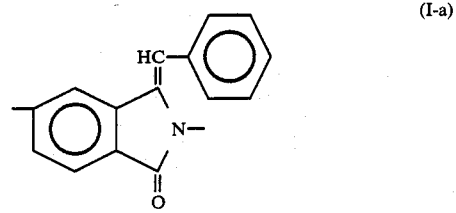

(I-a)

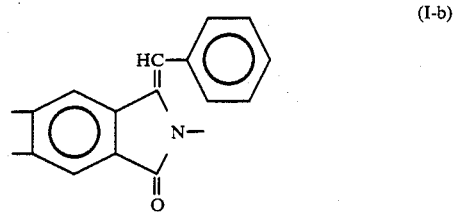

(I-b)

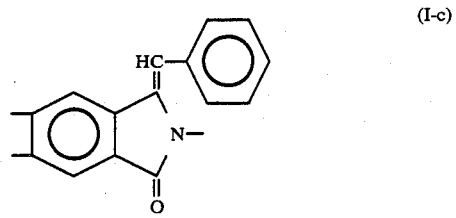

(I-c)

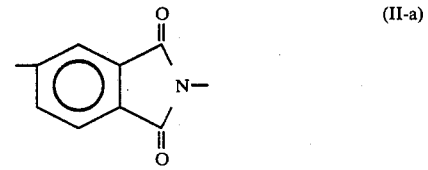

(II-a)

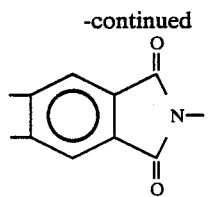

The above-mentioned structures (I-a) and (I-b) can be derived from a monomer prepared from, as a starting substance, a tetracarboxylic dianhydride having two or more rings, e.g., the following compound (III) (i.e., 5,6'-bis(3-benzylidene-3H-benzofuran-2-one)):

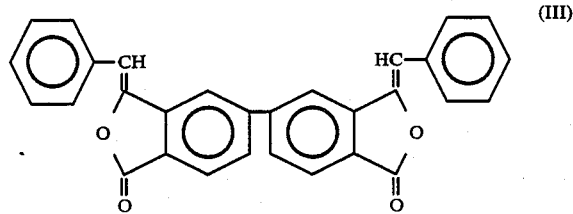

The above-mentioned structure (I-c) can be derived from a monomer prepared from, as a starting substance, a monocyclic or polycyclic aromatic tetracarboxylic dianhydride, e.g., the following compound (IV) (i.e., 3,5-DBP).:

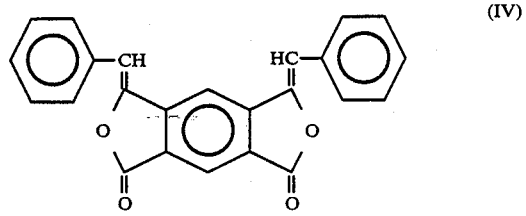

Furthermore, the above-mentioned structure (II-a) can be derived from two or more of tetracarboxylic dianhydride (e.g., biphenyl tetracarboxylic dianhydride), and the above-mentioned structure (II-b) can be derived from a monocyclic or polycyclic aromatic tetracarboxylic dianhydride.

DESCRIPTION OF THE PREFERRED EMBODIMENTS

Figure 1:
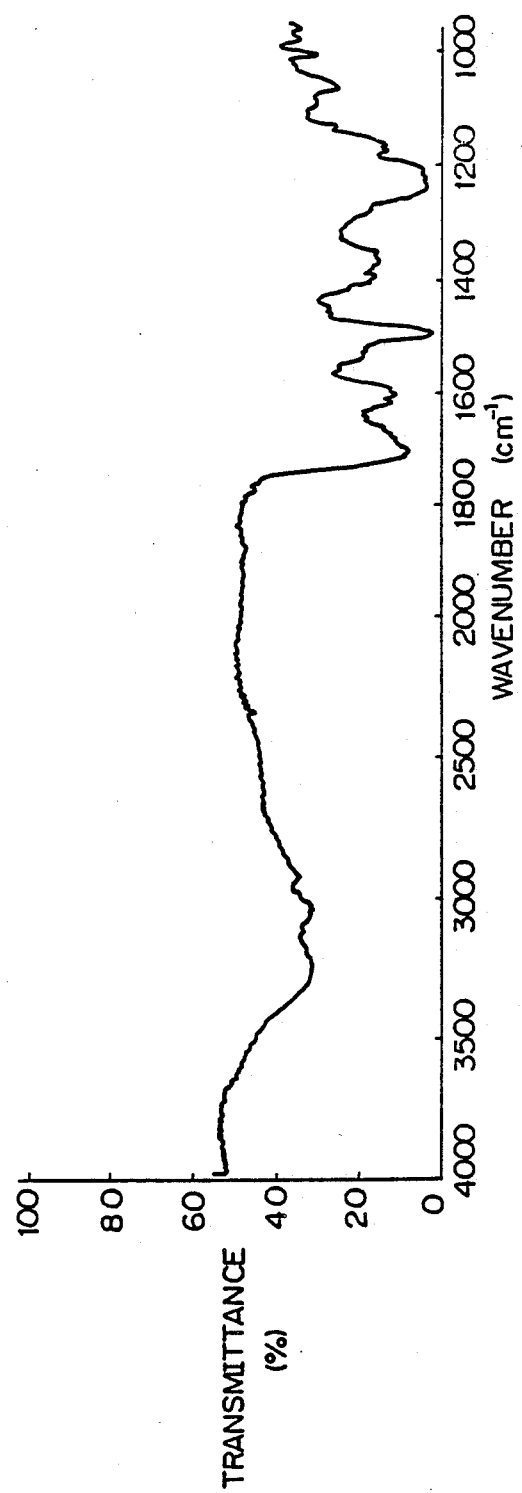
FIG. 1 is an IR absorption spectrograph of a copoly(-hydrated imidine-amic acid) synthesized by reacting 3,5-dibenzylidene-3,5-dihydro-1H,7H-benzo-1,2-C:4,5-c'difuran-1,7-dione, 4,4'-diaminophenyl ether, and 2,2-bis(3,4-dicarboxyl phenyl)hexafluoropropane dianhydride.

The present inventors engaged in in-depth studies to eliminate the defects of the prior art mentioned above and, as a result, discovered that, by synthesizing monomers having both imidine structures and imide structures, a superior solubility and a high molecular weight could be simultaneously realized, and thus they completed the present invention.

The copoly(imidine-imide) according to the present invention may be any of alternating copolymers, random copolymers, block copolymers, or composite copolymers of the same of imidines and imides. The present copoly(imidine-imide) can be obtained by reacting at least one of DBP, diamines, and aromatic tetracarboxylic dianhydrides at a predetermined ratio to synthesize a copoly(hydrated imidine-amic acid), and then performing known polyhydrated imidine dehydration treatment and polyamic acid dehydroimidization treatment.

The term "DBP" used herein means non-substituted or substituted dibenzilidenebenzodifurandiones having, for example, the following formula:

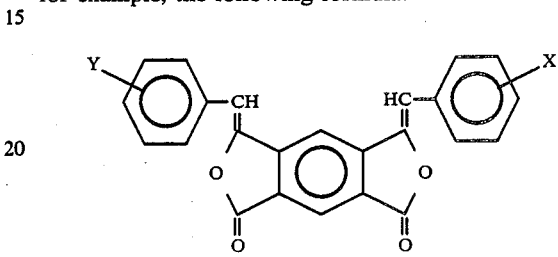

wherein X and Y are independently hydrogen, alkyl, alkoxy, and a halogen.

The DBP usable in the present invention means 3,5-dibenzylidene-3,5-dihydro-1H, 7H-benzo1,2-c:4,5-c'difuran 1,7-dione (3,5-DBP) and 3,7-dibenzylidene-3,7-dihydro-1H, 5H-benzo[1,2-c:4,5-c'[difuran 1,5-dione (3,7-DBP), which are compounds having the molecular structures shown below. These may be used alone or in any mixtures thereof.

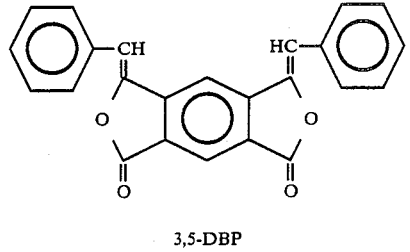

3,5-DBP

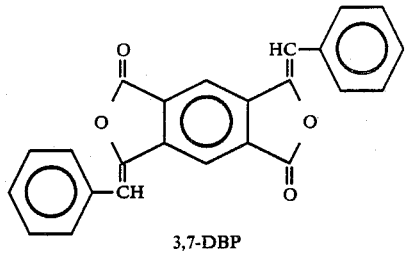

3,7-DBP

The diamines usable in the present invention include, for example, 1,3-diaminobenzene, 1,4-diaminobenzene, m-xylylenediamine, 4,4'-diaminophenyl ether, 2,2-bis(3'-amino-4' methylphenyl)hexafluoropropane, 2,2-bis(4'-aminophenyl)hexafluoropropane, tetramethylenediamine, hexamethylenediamine, and other aliphatic diamines including aromatic rings and aromatic diamines. The aromatic tetracarboxylic dianhydrides usable in the present invention include, for example, pyromellitic dianhydride, 3,3',4,4'-benzophenonetetracarboxylic dianhydride, 4,4'-oxydiphthalic dianhydride, 4,4'-thiodiphthalic dianhydride, 1,2-diphenylethane-3,3',4,4'-tetracarboxylic dianhydride, 1,1-dephenylethane-3,3',4,4'-tetracarboxylic dianhydride, 2,2-diphenylpropane-3,3',4,4'-tetracarboxylic dianhydride, 2,2-bis(3,4-dicarboxyl phenyl)hexafluoropropane dianhydride, and the like.

Of the above-mentioned compounds, the compounds especially preferably used in the present invention include 3,5-DBP as the DBP, m-xylylenediamine and 4,4'-diaminophenyl ether as the diamine, and pyromellitic dianhydride, 3,3',4,4'-benzophenontetracarboxylic dianhydride, 2,2-bis(3,4-dicarboxylic acid phenyl)hexafluoropropane dianhydride as the aromatic tetracarboxylic dianhydride.

The proportion of the above-mentioned monomers used has a remarkable effect on the average molecular weight of the polymer formed. The proportion of the total amount of the DBP and aromatic tetracarboxylic dianhydrides and the amount of the diamines should be 0.8 to 1.2 moles of the latter diamines to 1 mole of the total amount of the former DBP and aromatic tetracarboxylic dianhydrides. By making this proportion almost equimolar, a high molecular weight polymer can be obtained. The proportion of the DBP and aromatic tetracarboxylic dianhydride should be 0.1 to 10.0 moles, preferably 0.5 to 2.0 moles, of the latter aromatic tetracarboxylic dianhydrides to 1 mole of the former DBP.

Copoly(imidine-imide) can be synthesized, for example, in the following way. Namely, 3,5-DBP and 4,4'-diaminophenyl ether are reacted in a solvent such as dimethylformamide at a temperature of 120° C. for 24 hours, the heating is stopped and pyromellitic dianhydride is added, and then the reaction is continued at an ordinary temperature or a temperature below that for a further 24 hours to obtain a copoly(hydrated imidine-amic acid). It is known that polyamic acids are relatively unstable compounds and cause a reduction in the molecular weight for several factors. Therefore, the above-mentioned reaction is desirably performed under a dry, inert gas atmosphere, and thereafter, dehydroimidization performed by heating at a temperature of 200° C. under reduced pressure to obtain the desired copoly(imidine-imide). Nevertheless, the synthesis method is not limited to the above-mentioned method, and the reaction conditions and other factors may be suitably modified.

Although there are no critical mole ratios of the unit (I) to the unit (II), the preferable mole ratio (I)/(II) in the copolymer is 1/0.8 to 1/1.2.

The above-mentioned copoly(imidine-imide) was dissolved in a 0.25 g amount in 100 ml of concentrated sulfuric acid. The solution was measured at 25° C. by an Ostwald viscometer for use in determining the inherent viscosity ($\eta_{inh}$). The inherent viscosity was 0.60 dl/g or more. Excellent film-forming properties were shown and the polymer was soluble in usual organic solvents, so that workability was excellent, but the organic solvents which could dissolve these polymers differed according to the compositions of the polymers.

Further, the present copoly(imidine-imide) had an excellent heat resistance and showed a temperature at which a 10% weight loss was recorded, measured using a thermogravimetric analyzer (TGA), of over 400° C.

EXAMPLES

The present invention will be described in further detail with reference to the following Examples, which do not, however, limit the invention in any way.

EXAMPLE 1

A 1.0086 g amount (0.0050 mol) of 4,4'-diaminophenyl ether and 20 ml of N,N-dimethylacetamide were charged into a three-neck 50 ml flask equipped with an agitator and a reflux condensor and were reacted for 24 hours, while agitating, under an argon gas atmosphere at 120° C. with the gradual addition of 0.9238 g (0.0025 mol) of 3,5-dibenzylidene-3,5-dihydro-1H,7H-benzo[1,2-c:4,5-c']difuran-1,7-dione. Then, the heating was stopped, 0.5453 g (0.0025 mol) of pyromellitic dianhydride was gradually added, and the reaction was continued for 24 hours at room temperature. Thereafter, the reaction mixture was dropwise added into 500 ml of ethyl acetate, the precipitate thus formed was filtered under a reduced pressure and collected, and then dried under a reduced pressure. The amount of precipitate collected was 2.55 g. The precipitate was confirmed by the IR absorption spectrograph of FIG. 1 to be a copoly(hydrated imidine-amic acid). Further, the precipitate was heat treated under reduced pressure at 200° C. to change to a copoly(imidine-amic acid) and then a copoly(imidine-imide), which was shown by the IR absorption spectrograph of FIG. 2. This copoly(imidine-imide) was soluble in m-cresol, o-chlorophenol, and other organic solvents, had an inherent viscosity of 1.29 dl/g, and formed a strong film.

Figure 2:
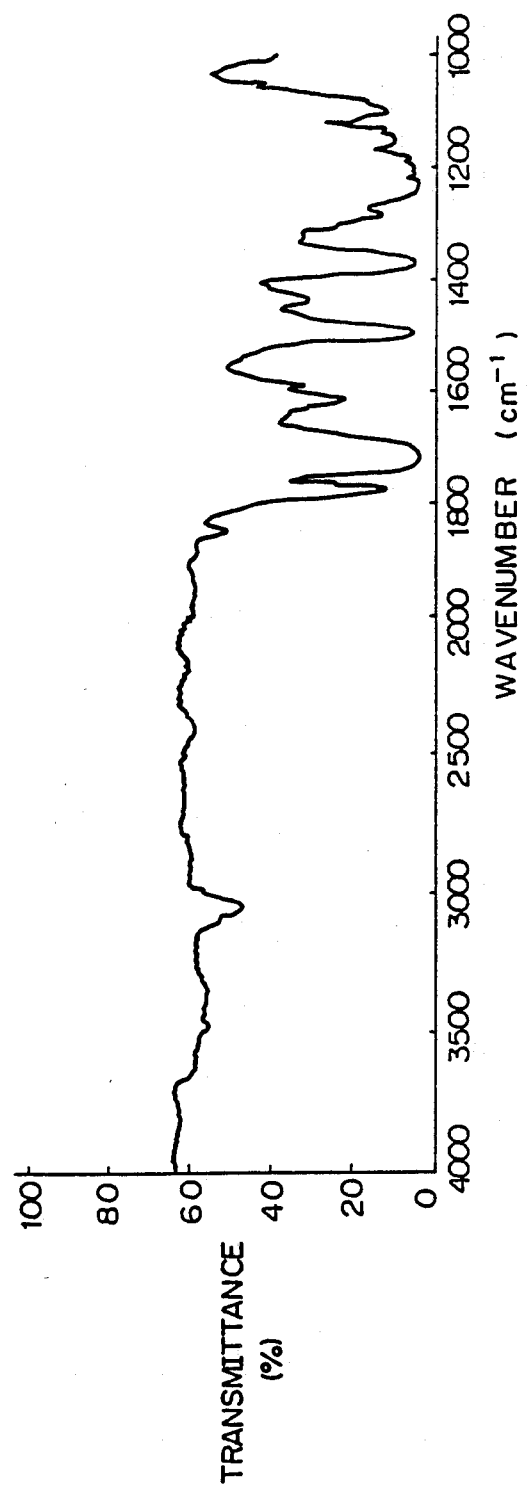
FIG. 2 is an IR absorption spectrograph of a polymer obtained by heating this polymer under a reduced pressure at a temperature of 200° C. to bring a change to a copoly(imidine-imide).

Turning to FIGS. 1 and 2, in more detail, the $\nu$O-H peak (near 3300 cm$^{-1}$) caused by the OH groups of the hydrated imidine and amic acid seen in FIG. 1 disappeared in the spectrograph after the heat treatment, i.e., as in FIG. 2. Instead, it was observed that a $\nu$C=C peak (1618 cm$^{-1}$) caused by the double carbon bonds of imidine and a $\nu$C=O peak (1775 cm$^{-1}$) caused by the carbonyl of the imide occurred, and accordingly, it was formed that the copoly(hydrated imidine-amic acid) was dehydroimidinized and dehydroimidized by the heat treatment under a reduced pressure to become a copoly(imidine-imide).

EXAMPLE 2

A 1.0536 g amount (0.0053 mol) of 4,4'-diaminophenyl ether and 25 ml of N,N-dimethylacetamide were charged into a three-neck 50 ml flask equipped with an agitator and a reflux condensor and were reacted for 24 hours, while agitating, under an argon gas atmosphere at 130° C. with the gradual addition of 0.9620 g (0.0026 mol) of 3,5-dibenzylidene-3,5-dihydro-1H,7H-benzo[1,2-c:4,5-c']difuran-1,7-dione. Then, the heating was stopped, 1.1560 g (0.0026 mol) of 2,2-bis[3,4-dicarboxyl phenyl]hexafluoropropane dianhydride was gradually added, and the reaction was continued for 24 hours at room temperature. Thereafter, the reaction mixture was dropwise added into 400 ml of ethyl acetate, the precipitate was filtered under a reduced pressure and collected, and then dried under a reduced pressure.

The amount of precipitate collected was 3.16 g. The precipitate was heat treated under a reduced pressure at 200° C. to obtain the desired copoly(imidine-imide).

The results are shown in Tables 1 and 2.

EXAMPLE 3

A 1.0290 g amount (0.0076 mol) of m-xylylenediamine and 15 ml of N,N-dimethylacetamide were charged into a three-neck 50 ml flask equipped with an agitator and a reflux condensor and were reacted for 24 hours, while agitating, under an argon gas atmosphere at 100° C. with the gradual addition of 1.3838 g (0.0038 mol) of 3,5-dibenzylidene-3,5-dihydro-1H,7H-benzo[1,2-c:4,5-c']-difuran-1,7-dione. Then, the heating was stopped, 0.8238 g (0.0038 mmol) of pyromellitic dianhydride was gradually added, and the reaction was continued for 24 hours at room temperature. Thereafter, the reaction mixture was dropwise added into 500 ml of ethyl acetate, the precipitate was filtered under a reduced pressure and collected, and then dried under a reduced pressure. The amount of precipitate collected was 2.23 g. The precipitate was heat treated under a reduced pressure at 200° C. to obtain the desired copoly(imidine-imide).

The results are shown in Tables 1 and 2.

EXAMPLE 4

A 0.9484 g amount (0.007 mol) of m-xylylenediamine and 25 ml of N-methylpyrrolidone were charged into a three-neck 50 ml flask equipped with an agitator and a reflux condensor and were reacted for 24 hours, while agitating, under an argon gas atmosphere at room temperature with the gradual addition of 1.2754 g (0.0035 mol) of 3,5-dibenzylidene-3,5-dihydro-1H,7H-benzo[1,2-c:4,5-c']difuran-1,7-dione. Then, 1.5465 g (0.0035 mmol) of 2,2-bis[3,4-dicarboxyl phenyl]hexafluoropropane dianhydride was gradually added, and the reaction was continued for 24 hours. Thereafter, the reaction mixture was dropwise added into 500 ml of ethyl acetate, the precipitate was filtered under a reduced pressure and collected, and then dried under a reduced pressure. The amount of precipitate collected was 3.47 g. The precipitate was heat treated under a reduced pressure at 200° C. to obtain the desired copoly(imidine-imide).

The results are shown in Tables 1 and 2.

EXAMPLE 5

A 1.8486 g amount (0.0136 mol) of m-xylylenediamine and 5 ml of N,N-dimethylacetamide were charged into a three-neck 50 ml flask equipped with an agitator and a reflux condensor and were reacted for 24 hours, while agitating, under an argon gas atmosphere at 100° C. with the gradual addition of 2.4898 g (0.0068 mol) of 3,7-dibenzylidene-3,7-dihydro-1H,5H-benzo[1,2-c:4,5-c']difuran-1,5-dione. Then, the heating was stopped and 1.4872 g (0.0068 mol) of pyromellitic dianhydride was gradually added, and the reaction was continued for 24 hours at room temperature. Thereafter, the reaction mixture was dropwise added into 500 ml of deionized water, the precipitate was filtered under a reduced pressure and collected, and then dried under a reduced pressure. The amount of precipitate collected was 5.57 g. The precipitate was heat treated under a reduced pressure at 200° C. to obtain the desired copoly(imidine-imide).

The results are shown in Tables 1 and 2.

EXAMPLE 6

A 1.1546 g amount (0.0085 mol) of m-xylylenediamine and 12 ml of N-methylpyrrolidone were charged into a three-neck 50 ml flask equipped with an agitator and a reflux condensor and were reacted for 24 hours, while agitating, under an argon gas atmosphere at room temperature with the gradual addition of 1.5527 g (0.00425 mol) of 3,5-dibenzylidene-3,5-dihydro-1H,7H-benzo[1,2-c:4,5-c']difuran-1,7-dione. Then, 1.3656 g (0.00425 mol) of 3,3',4,4'-benzophenonetetracarboxylic dianhydride was gradually added, and the reaction was continued for 24 hours at room temperature. Thereafter, the reaction mixture was dropwise added into 500 ml of ethyl acetate, the precipitate was filtered under a reduced pressure and collected, and then dried under a reduced pressure. The amount of precipitate collected was 3.90 g. The precipitate was heat treated under a reduced pressure at 200° C. to obtain the desired copoly(imidine-imide).

The results are shown in Tables 1 and 2.

EXAMPLE 7

A 2.0151 g amount (0.0100 mol) of 4,4'-diaminophenyl ether and 20 ml of N-methylpyrrolidone were charged into a three-neck 50 ml flask equipped with an agitator and a reflux condensor and were reacted for 24 hours, while agitating, under an argon gas atmosphere at 120° C. with the gradual addition of 1.8464 g (0.0050 mol) of 3,5-dibenzylidene-3,5-dihydro-1H,7H-benzo[1,2-c:4,5-c']difuran-1,7-dione. Then, the heating was stopped and 1.6208 g (0.0050 mol) of 3,3',4,4'-benzophenonetetracarboxylic dianhydride was gradually added, and the reaction was continued for 24 hours at room temperature. Thereafter, the reaction mixture was dropwise added into 700 ml of ethyl acetate, the precipitate was filtered under reduced a pressure and collected, and then dried under a reduced pressure. The amount of precipitate collected was 5.06 g. The precipitate was heat treated under a reduced pressure at 200° C. to obtain the desired copoly(imidine-imide).

The results are shown in Tables 1 and 2.

TABLE 1

| Example No. | Inherent viscosity | | IR absorption spectrograph | | Heat decomposition temperature (10% wt. loss temp.) (°C.) |
|---|---|---|---|---|---|
| | II*1 dl/g | AA*2 dl/g | Vc = O (cm$^{-1}$) | Vc = C (cm$^{-1}$) | |
| 1 | 1.02 | 0.98 | 1775 | 1618 | 560 |
| 2 | 1.20 | 0.96 | 1782 | 1618 | 560 |
| 3 | 0.62 | 0.60 | 1771 | 1601 | 460 |
| 4 | 1.06 | 0.84 | 1770 | 1620 | 450 |
| 5 | 0.67 | 0.64 | 1776 | 1630 | 440 |
| 6 | 0.75 | 0.73 | 1775 | 1618 | 455 |
| 7 | 0.68 | 0.67 | 1772 | 1614 | 520 |

II: Copoly(imidine-imide)
AA: Copoly(hydrated imidine-amic acid)
*1: Measured by dissolving 0.25 g of polymer in 100 ml of concentrated sulfuric acid and testing the solution at 25° C. using an Ostwald viscometer.
*2: Measured by dissolving 0.25 g of polymer in 100 ml of N-methylpyrrolidone and testing the solution at 25° C. using an Ostwald viscometer.

TABLE 2

| Example No. | Film-forming property | Color | Solvent | | | | | | |
|---|---|---|---|---|---|---|---|---|---|
| | | | MC | OC | NMP | DMAC | DMF | THF | CHCl₃ |
| 1 | Good | Yellow-green | Sol. | Sol. | Insol. | Insol. | Insol. | Insol. | Insol. |
| 2 | Good | Dark yellow | Slightly sol. | Slightly sol. | Sol. | Sol. | Sol. | Sol. | Insol. |
| 3 | Good | Light yellow | Sol. | Sol. | Sol. | Sol. | Sol. | Insol. | Sol. |
| 4 | Good | Yellow | Sol. | Sol. | Sol. | Sol. | Sol. | Sol. | Sol. |
| 5 | Good | Yellow | Sol. | Sol. | Sol. | Sol. | Slightly sol. | Insol. | Sol. |
| 6 | Good | Yellow | Slightly sol. | Sol. | Slightly sol. | Slightly sol. | Slightly sol. | Insol. | Insol. |
| 7 | Good | Dark yellow | Slightly sol. | Sol. | Swell | Swell | Swell | Insol. | Insol. |

MC: m-cresol
OC: o-chlorophenol
NMP: N-methylpyrrolidone
DMAC: N,N-dimethylacetoamide
DMF: N,N-dimethylformamide
THF: Tetrahydrofuran
CHCl₃: Chloroform As explained above, the copoly(imidine-imide) of the present invention is a higher molecular weight material with an excellent heat resistance and workability has an extremely wide range of industrial application, and is useful for industrial development.

We claim:

1. A copoly(imidine-imide) comprising a copolymer of polyimidines and polyimides having, in the basic chain structure of the polymer, imidine structures represented by formula (I) and the imide structures represented by the formula (II):

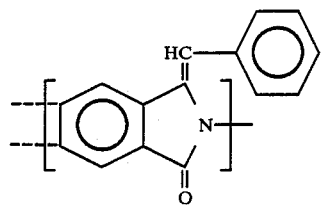

[I]

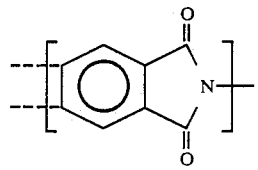

[II]

2. A copoly(imidine-imide) as claimed in claim 1, wherein the inherent viscosity ($\eta_{inh}$), based on a value obtained by dissolving 0.25 g of the copoly(imidine-imide) in 100 ml of concentrated sulfuric acid and measuring the solution at 25° C., is 0.60 dl/g or more.

3. A copoly(imidine-imide) as claimed in claim 1, wherein the copolymer is derived from dibenzilidene, benzo furandione, diamines, and aromatic tetracarboxylic dianhydrides.

4. A copoly(imidine-imide) as claimed in claim 1, wherein said three substances of dibenzilidene benzo furandione, m-xylylenediamine and/or 4,4'-diaminophenyl ether, and aromatic tetracarboxylic dianhydrides are used as the starting materials.

5. A copoly(imidine-imide) as claimed in claim 1, wherein dibenzilidene benzo furandione, diamines and pyromellitic dianhydride and/or 3,3', 4,4,-benzophenonetetracarboxylic dianhydride and/or 2,2-bis(3,4-dicarboxyl phenyl)hexafluoropropane dianhydride are used as the starting monomers.

6. A copoly(imiqine-imide) as claimed in claim 1, wherein dibenzilidene benzo furandione, and/or 4,4'-diaminophenyl ether, and pyromellitic dianhydride and/or 3,3', 4,4'-benzophenonetetracarboxylic dianhydride and/or 2,2-bis(3,4-dicarboxyl phenyl)hexafluoropropane anhydride are used as the starting monomers.

* * * * *